Aug. 23, 1955     F. E. DENNEWITZ     2,715,865

LAND LEVELLING ATTACHMENT FOR CULTIVATOR

Filed June 3, 1952

INVENTOR.
FRED E. DENNEWITZ,
BY

McMorrow, Berman & Davidson
ATTORNEYS.

United States Patent Office 2,715,865
Patented Aug. 23, 1955

2,715,865

LAND LEVELLING ATTACHMENT FOR CULTIVATOR

Fred E. Dennewitz, Forrest, Ill.

Application June 3, 1952, Serial No. 291,449

1 Claim. (Cl. 97—56)

This invention relates to ground levelling attachments for cultivators and more particularly to a ground levelling attachment which can be adjustably mounted on a cultivator shank to trail the corresponding shovel and fill in the furrow made by the shovel.

It is among the objects of the invention to provide an improved ground levelling attachment which can be easily mounted on a cultivator shank with no material modification of the shank construction to trail the corresponding cultivator shovel and fill in the furrow made by the shovel; which includes a unitary ground engaging member and a bracket assembly which supports the ground engaging member on the associated cultivator shank against loosening or accidental movement out of adjustment relative to the associated shank; which can be mounted on a trip shank to move with the shank when the latter is tripped; and which is simple and durable in construction, economical to manufacture, and positive and effective in operation.

Other objects and advantages will become apparent from a consideration of the following description and the appended claim in conjunction with the accompanying drawing wherein:

Figure 1:
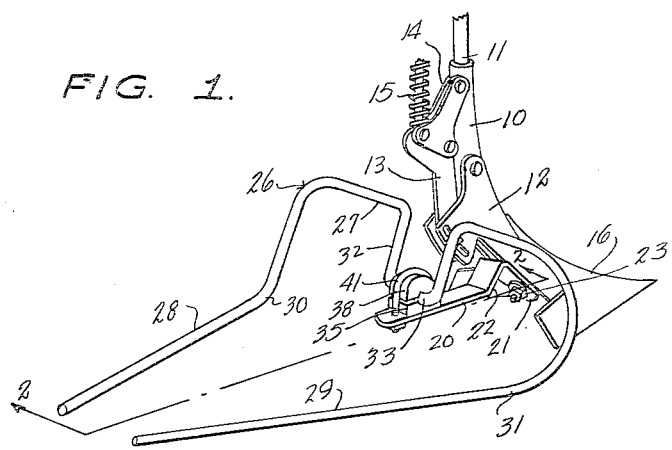
Figure 1 is a perspective view of a cultivator shank and shovel assembly with a ground levelling attachment illustrative of the invention operatively mounted thereon.

With continued reference to the drawing, the cultivator shank 10 includes a stem 11 depending from the cultivator frame, a shovel carrier 12 pivotally mounted at its upper end on the stem 11 near the lower end of the stem, toggle levers 13 and 14 connected between the stem 11 and the shovel carrier 12 and a spring 15 acting between the spring and the toggle levers to maintain the shovel carrier in operative position relative to the stem, this spring being compressible if the associated shovel encounters a solid obstacle, to release the toggle levers and permit the shovel and shovel carrier to swing rearwardly and upwardly, so that the shovel can pass over the obstacle without breaking the shovel or the shank. A cultivator shovel 16 is mounted on the shovel carrier 12 at the lower end of the carrier and is inclined forwardly and downwardly from the associated carrier.

As cultivator shanks and shovels are well known to the art, a more detailed description of this structure is considered unnecessary for the purposes of the present disclosure.

The ground levelling attachment of the present invention comprises a flat bracket 20 having at one end an angularly offset portion 21 connected to the remainder of the bracket by an angularly disposed intermediate portion 22, so that this end of the bracket resembles an inverted V having one leg, corresponding to the portion 21, longer than the other leg, corresponding to the bracket portion 22. The angularly offset portion 21 of the bracket is divided near its outer end with an aperture which receives a bolt 23 which bolt extends through the shovel carrier 12 of the cultivator shank and through an aperture in the shovel and secures the shovel to the shank and also secures the bracket 20 to the shank at the rear side of the shank. The bracket 20 extends rearwardly from the shovel carrier portion 12 of the cultivator shank 10 and is provided near its rear end with apertures 24 and 25 which are spaced apart longitudinally of the bracket.

Figure 2:
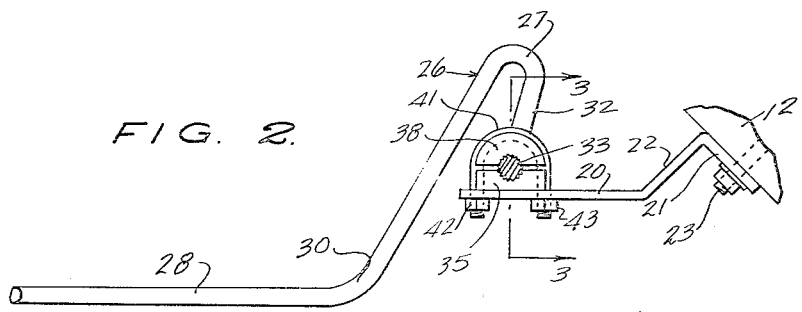
Figure 2 is a fragmentary cross sectional view on the line 2—2 of Figure 1.
Figure 3:
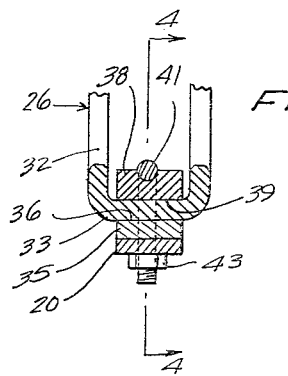
Figure 3 is a fragmentary cross sectional view on the line 3—3 of Figure 2.
Figure 4:
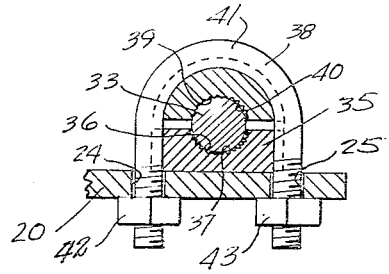
Figure 4 is a fragmentary cross sectional view on an enlarged scale on the line 4—4 of Figure 3.

A ground engaging element, generally indicated at 26, is provided by a length of metal rod bent to substantially U shape and includes an intermediate portion 27 and legs 28 and 29 extending symmetrically and convergently from the intermediate portion 27 at the respectively opposite ends of the latter. The legs 28 and 29 are bent intermediate their length, as indicated at 30 and 31, so that the portions of the legs adjacent the intermediate portion of the member have their center lines in a plane disposed at an angle to a plane including the longitudinal center lines of the portions of the legs adjacent the open end of the member. At the mid-length location of the intermediate portion 27 the ground engaging member 26 is provided with a crank 32 which extends inwardly of the member from the intermediate portion and is of substantially rectangular shape having a straight intermediate or bight portion 33. The longitudinal center line of the crank 32 is disposed at an acute angle to the plane of the center lines of the portions of the legs 28 and 29 adjacent the intermediate portion 27 of the ground engaging member and at an obtuse angle to the plane of the center lines of the portions of the legs 28 and 29 adjacent the open end of the member 26, as illustrated in Figure 2.

A block 35 of rectangular shape is disposed on the bracket 20 between the apertures 24 and 25 spaced apart longitudinally of the bracket and this block is provided in its surface remote from the bracket with a groove 36 of substantially semicylindrical shape which extends transversely of the bracket and is provided with longitudinally extending serrations 37. A second block or cap 38 of substantially semicylindrical shape is disposed on the block 35 with its flat side adjacent the side of the block 35 remote from the bracket 20 and the block 38 is also provided with a groove 39 of substantially semicylindrical shape registering with the groove 36 in the block 35 and provided with longitudinally extending serrations 40. The intermediate portion 33 of the crank portion 32 of the ground engaging member 26 is received in the grooves 36 and 39 of the blocks 35 and 38.

A U bolt 41 extends around the blocks 35 and 38 and has its externally screw threaded end portions projecting through the apertures 24 and 25 in the bracket 20. The block 38 is grooved in its outer surface and the block 35 is grooved in its opposite side to partly receive the U bolt 41, and nuts 42 and 43 are threaded onto the ends of the U bolt 41 at the side of the bracket 20 remote from the blocks 35 and 38 to secure the blocks to the bracket and firmly clamp the intermediate portion 33 of the crank 32 between the blocks in the serrated grooves 36 and 39.

With this arrangement, with the nuts 42 and 43 loosened on the U bolt 41, the rear ends of the legs 28 and 29 of the ground engaging member can be brought to the desired position relative to the bracket 20 and the nuts then tightened to securely clamp the ground engaging member in adjusted position relative to the bracket and the shank 10 of the cultivator. The clamp blocks will hold the ground engaging member against movement out of adjustment relative to the bracket and the cultivator shank and the ground engaging element will trail the cultivator shovel 16 with its legs 28 and 29 moving through the ground at the respectively opposite sides of the furrow made by the shovel. The rearwardly converging relationship of the legs 28 and 29 will pull the earth from the sides of the furrow back into the furrow and level the ground behind the cultivator shovel, so that no noticeable ridges will be left in a cultivated field.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A ground levelling attachment for a cultivator having a shank and a shank-supported shovel, comprising a flat bracket having a leading end portion formed with an angularly offset portion adapted to be affixed to said shovel and a trailing end portion lying in a horizontal plane, said trailing end portion having a pair of openings spaced longitudinally thereof; a pair of superposed blocks supported upon said trailing end portion, said blocks being disposed between the openings of said trailing end portion and including a lower block contacting the upper surface of said portion and an upper block disposed above the lower block, the lower block being of rectangular configuration and being formed at opposite ends thereof with vertically extending grooves of arcuate cross section registering with said openings, said lower block having a flat top surface formed intermediate the opposite ends of the block with a transversely extending recess of arcuate cross section, the well of said recess being formed with serrations extending fully from side to side of the block transversely of the block and trailing end portion, the upper block being formed as a semi-cylindrical member having a flat underside spaced from the flat upper surface of the lower block, said underside of the upper block being formed with an arcuate recess, opposing the recess of the lower block and having a wall formed with serrations extending fully from side to side of the upper block transversely of the trailing end portion, said upper block having a semi-cylindrical top surface formed with a groove of arcuate cross section extending from end to end of the upper block, the groove of the upper block having its ends registered with the grooves of the lower block; a ground-engaging element formed from a length of metal rod material bent to substantially a U-shape to include a bight portion and legs extending symmetrically and convergently from opposite ends of said bight portion, said bight portion being formed with a crank intermediate its ends and said crank having a straight intermediate part seated in the recesses of the blocks and serving to maintain the blocks in spaced relation, said legs extending as trailing elements in back of the shovel to level ground penetrated by the shovel; and a bolt of inverted U-shape straddling the blocks, said bolt having a bight portion seated in the groove of the upper block and having depending legs extending within the grooves of the lower block through said openings, for forcing the blocks into gripping engagement with the bight of the ground-engaging element.

References Cited in the file of this patent

UNITED STATES PATENTS

| | | |
|---|---|---|
| 790,387 | Pederson | May 23, 1905 |
| 937,674 | Browning | Oct. 19, 1909 |
| 2,483,204 | Johnson et al. | Sept. 27, 1949 |
| 2,561,854 | Goodspeed | July 24, 1951 |